United States Patent [19]

Mominee et al.

[11] 4,028,525

[45] June 7, 1977

[54] APPARATUS FOR CREATING HOLES IN FLEXIBLE MEMBERS

[75] Inventors: David E. Mominee, Alpine; Gilbert W. Vance, Jamul, both of Calif.

[73] Assignee: Reed Irrigation Systems, El Monte, Calif.

[22] Filed: Nov. 6, 1975

[21] Appl. No.: 629,494

Related U.S. Application Data

[60] Continuation of Ser. No. 460,812, April 15, 1974, abandoned, which is a division of Ser. No. 239,921, March 31, 1972, Pat. No. 3,808,394.

[52] U.S. Cl. .............................. 219/121 L; 264/25
[51] Int. Cl.² .......................................... H05B 9/00
[58] Field of Search ............... 219/121 L, 121 LM; 264/22, 25, 154, 155, 156

[56] References Cited

UNITED STATES PATENTS

| | | | |
|---|---|---|---|
| 3,325,819 | 6/1967 | Fraser | 219/121 L |
| 3,562,377 | 2/1971 | Zetzsche | 264/156 |
| 3,594,261 | 7/1971 | Broerman | 219/121 LM |
| 3,612,814 | 10/1971 | Houldcroft | 219/121 L |
| 3,622,742 | 11/1971 | Cohen et al. | 219/121 L |
| 3,772,496 | 11/1973 | Harenda-Harinxma | 219/121 LM |

OTHER PUBLICATIONS

H. S. Silvus et al., "Precise Perforations Every Time", *The Tool Manufacturing Engineer*, Nov. 1969, pp. 46-49.

R. B. Barber et al., "Some Novel Approaches in the Utilization of Lasers in Materials Processing", *Record of the 10th Symposium on Electron, Ion, & Laser Beam— Tech.*, May 1969.

*Primary Examiner*—J. V. Truhe
*Assistant Examiner*—Clifford C. Shaw
*Attorney, Agent, or Firm*—Gordon L. Peterson

[57] ABSTRACT

A small hole may be formed in a wall of a flexible member or structure such as a tube of a thermoplastic material by an apparatus including a rotating wheel by a laser beam source directed towards the wheel, and rotating reflecting means for reflecting the beam from this source so as to direct the beam towards a specific area of the flexible member. Preferably the flexible member is held against a surface of the wheel as the beam is directed so as to engage only a single point on the surface of the flexible member.

15 Claims, 7 Drawing Figures

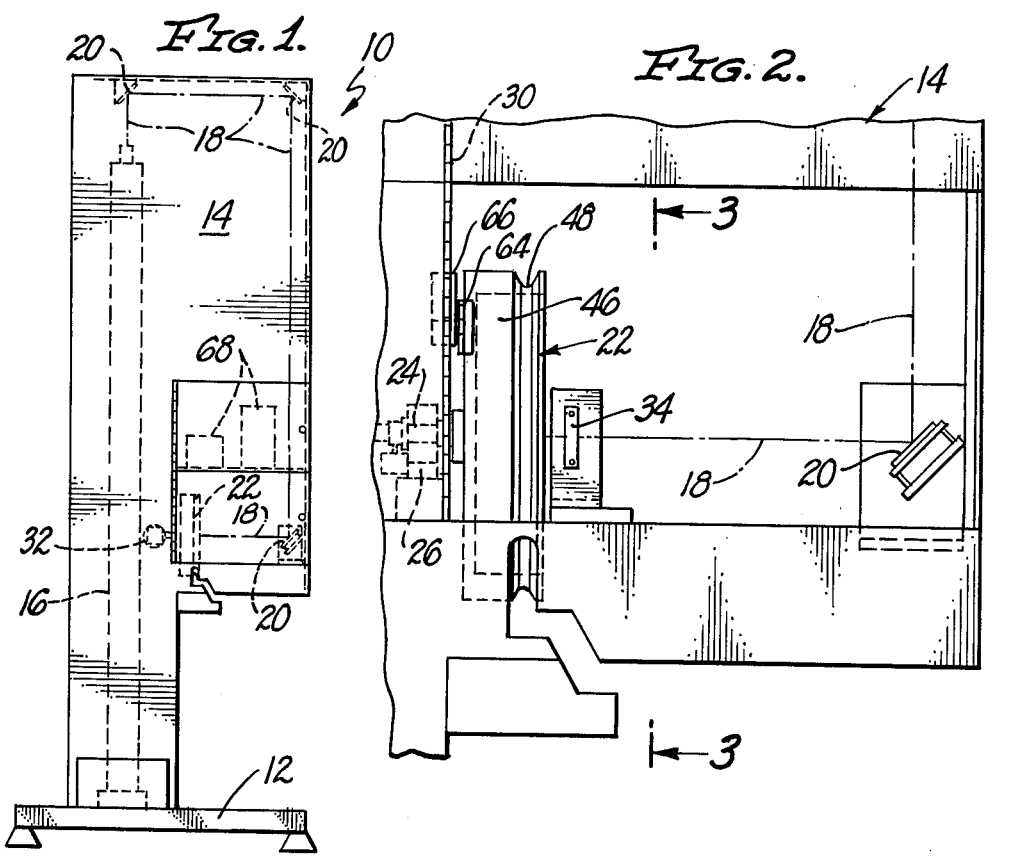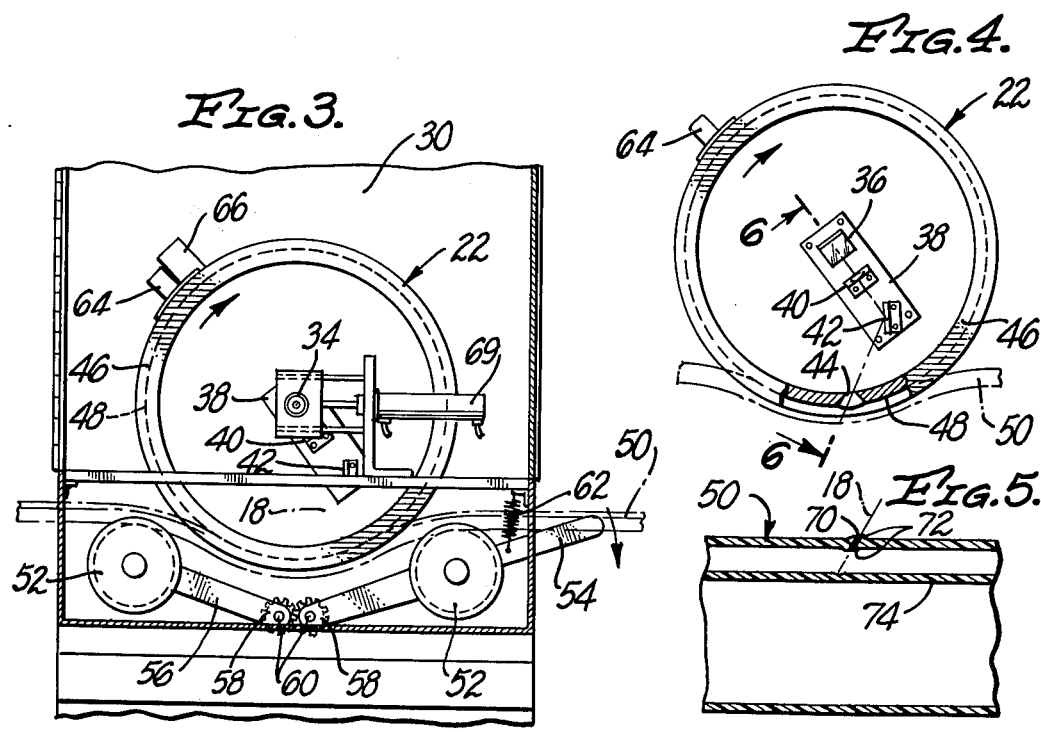

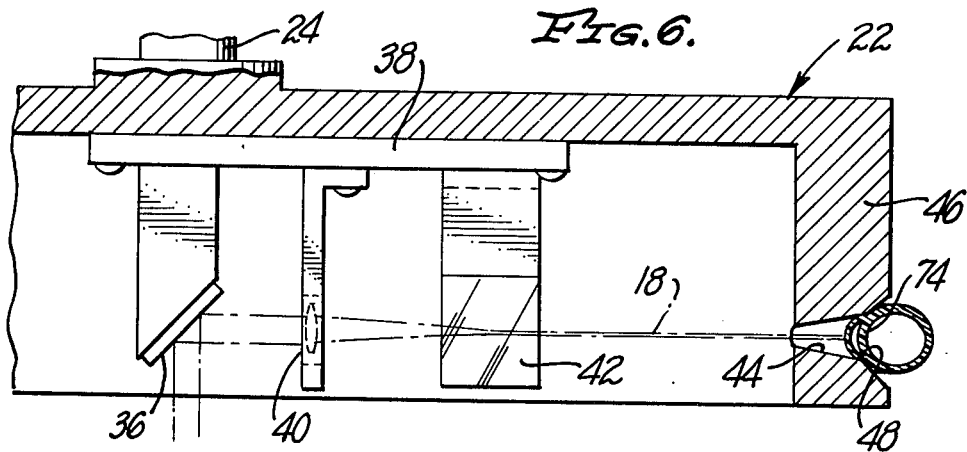
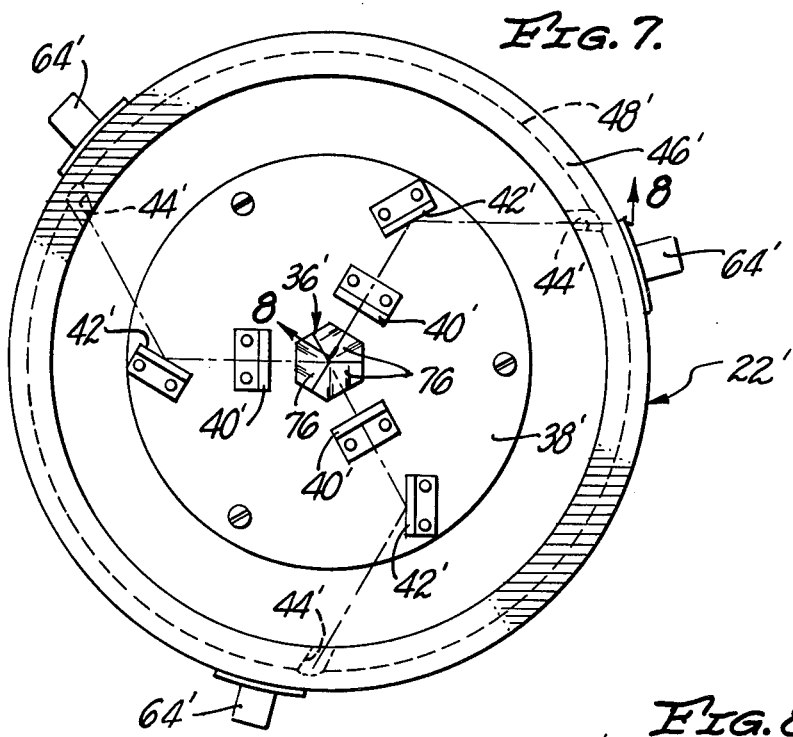
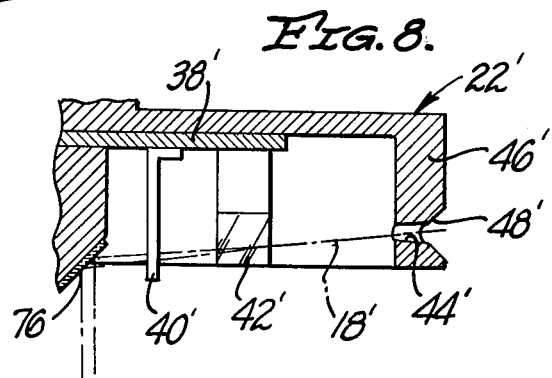

APPARATUS FOR CREATING HOLES IN FLEXIBLE MEMBERS

CROSS-REFERENCE TO RELATED APPLICATIONS

Donald E. Mock application Ser. No. 197,242 filed Nov. 10, 1971, entitled "Irrigation Conduit." This application is a continuation of application Ser. No. 460,812, filed Apr. 15, 1974, now abandoned, entitled "Apparatus For Creating Holes In Flexible Members," and naming David E. Mominee and Gilbert W. Vance as the joint inventors, which is in turn a division of the copending Mominee et al. application Ser. No. 239,921, filed Mar. 31, 1972, entitled, "Creating Holes in Flexible Members," now U.S. Pat. No. 3,808,394. The entire disclosure of this copending application Ser. No. 239,921 is incorporated herein by reference.

BACKGROUND OF THE INVENTION

The invention described in this specification is primarily intended to be utilized in conjection with the production of tubes to be utilized for water distribution purposes, but which are also capable of being used for other purposes. It is also capable of being used with other flexible structures or members. Such tubes are commonly utilized as irrigation conduits. They are formed so as to include periodically spaced external holes used to distribute water from their interiors to their exteriors at various spaced points along their lengths.

The simplest form of such a tube consists of an elongated tubular member, normally a member of circular cross-sectional configuration, having comparatively fine holes spaced along its length. It has been discovered that tubes having an internal wall dividing them into two internal sections and having periodically spaced holes in this internal wall are more desirable than simple tubes having undivided interiors for water distribution purposes because with such internally divided tubes it is possible to obtain a pressure step-down effect tending to restrict the amounts of water emitted from the external holes employed.

With both of these types of tubular irrigation conduits a problem has been encountered in creating the holes used so that these holes are of a carefully controlled dimension so that the amounts of water emitted through them and/or passing through them will be regulated in order to achieve substantially uniform water distribution along the length of a tube and/or in order to achieve controlled water distribution along the length of a tube. In connection with this, it will be realized that such controlled water distribution is necessary for efficient, economic irrigation without the waste of water.

This problem is considered to be particularly severe because of the fact that strength material thickness considerations have made it desirable to utilize seamless tubes for water or similar distribution purposes. Such seamless tubes are comparatively hard to process utilizing conventional hole producing methods so that holes are created in them which are extremely uniform in character and/or are of a carefully controlled character, and which are of such a nature that their interiors do not contain internal fragments or projections which might interfere with a controlled or metered distribution of water.

SUMMARY OF THE INVENTION

An objective of the present invention is to provide apparatus for the improved production of periodically spaced holes extending along the lengths of tubes as indicated in the preceding. A further objective of the present invention is to provide apparatus for the convenient economic, rapid production of holes of a uniform and/or desired character along the lengths of tubes of the type indicated or along the lengths of other flexible members or structures, including the production of holes in interior walls within tubes or structures having such walls. From a consideration of these broad objectives of the invention, it will be realized that the invention is intended to provide an efficient, reliable apparatus for the production of such holes. The apparatus of the invention is considered to be particularly significant in that it can be used so as to create such holes in seamless tubing without creating holes which extend through opposite sides of such tubing.

BRIEF DESCRIPTION OF THE DRAWINGS

A brief summary of this type is inherently incapable of delineating many facets and features of an invention which are significant and important and indicating many advantages of an invention as are normally apparent to one skilled in the art of the invention from a detailed study of it. It is considered that such items will be apparent to one skilled in the field of this invention from a detailed consideration of the remainder of this specification, the appended claims and the accompanying drawings in which:

FIG. 1 is an end elevational view of a presently preferred apparatus for carrying out this invention in accordance with the concepts herein set forth;

FIG. 2 is an enlarged view of part of the structure shown in FIG. 1;

FIG. 3 is a partial cross-sectional view taken at line 3—3 of FIG. 2;

FIG. 4 is a diagrammatic view indicating the operation of certain of the parts shown in the preceding figures;

FIG. 5 is a partial cross-sectional view illustrating the angle at which a laser beam preferably is used as to intercept a tube processed in accordance with this invention.

FIG. 6 is a partial cross-sectional view of a diagrammatic pipe illustrating the path taken by a laser beam taken along line 6—6 of FIG. 4;

FIG. 7 is a view corresponding to FIG. 4 showing a modified moving member and associated parts capable of being used in accordance with the concepts of this invention; and, FIG. 8 is a view corresponding to FIG. 6 taken along line 8—8 of FIG. 7.

In considering this invention it is to be realized that the particular structures shown in the drawings are not the invention itself inasmuch as the invention itself consists of certain intangible concepts as are set forth or defined in the appended claims forming a part of this disclosure. Through the use of routine engineering skill these concepts or features can be embodied within or used with other apparatuses than the specific structure shown.

DETAILED DESCRIPTION OF THE PREFERRED EMBODIMENT

In FIG. 1 of the drawings there is shown an apparatus 10 in accordance with the invention which includes a conventional base 12 supporting an upstanding housing 14. Within the interior of this housing 14, there is located a known, preferably conventional means or apparatus 16 for generating a laser beam 18. Because of the fact that equipment of the type of the apparatus 16 is well-known at the present time, it is not considered necessary to discuss it in detail in this specification.

For similar reasons it is not considered necessary to discuss in this specification in detail the nature of the beam 18. It is well-known that such a beam 18 is composed of coherent, monochromatic light waves. Various different light sources can be utilized as the apparatus 16 provided that such sources are capable of generating or creating a laser beam which has sufficient energy so as to heat a thermoplastic or other flexible material in order to create a hole or opening in such material.

In the apparatus 10 such a beam 18 is reflected against a series of three mirrors 20 mounted with the housing 14 so that the beam 18 travels horizontally towards the center region of a wheel 22 serving as a continuous moving member as hereinafter indicated. This wheel 22 is mounted upon a shaft 24 supported by a bearing 26 located on an internal wall 30 within the housing 14. A conventional mechanical means can be used to rotate the wheel 22.

Preferably the beam 18 travels towards the wheel 22 along the axis of this wheel 22 as to pass through a known, conventional so-called trimmer 34 in such a manner as to engage a mirror 36 set at a 45° angle to the plane of the wheel 22. This trimmer 34 is preferably used in a conventional manner during the operation of the apparatus 10 so as to control the beam 18 used. It is considered well-established to control the size, energy and diffraction of a beam such as the beam 18 by a device of the type of the trimmer 24. Such beam control is considered necessary in order to obtain satisfactory operation of the apparatus 10.

For convenience, the mirror 36 is mounted on a small mounting plate 38 which is secured to the wheel 22. In the apparatus 10, this mounting plate 38 also holds a known condensing lens 40 located in the path of the beam 18 as it is reflected by the mirror 36 and another mirror 42 which reflects the beam 18 as it passes the lens 40 toward a small opening 44 located in a peripheral flange 46 formed on the periphery of the wheel 22.

The flange 46 contains a groove 48 of a depth and configuration corresponding to a part of the depth of a tube 50 to be perforated in accordance with the invention. This tube 50 preferably should be of a conventional flexible thermoplastic material such as a known plasticized vinyl polymer composition or other similar composition. In effect, the groove 48 should be sufficiently deep so that the tube 50 may be held by tension wheels 52 within it without relative motion between the tube 50 and the flange 46 during the operation of the apparatus 10.

These tension wheels 52 are mounted upon arms 54 and 56 which are secured to small coacting gears 58. Both these arms 54 and 56 and the gears 58 are rotatably mounted upon shafts 60 so that a single biasing means such as the spring 62 working against either of the arms 54 or 56 will tend to bias both of the wheels 52 to the same degree in such a manner as to hold the tube 50 as indicated in FIG. 3 of the drawings within the groove 48 to a uniform extent as a specific portion or area of this tube 50 moves along with the wheel 22 as this wheel 22 is rotated.

As the apparatus 10 is operated so that the tube 50 moves in this manner specific regions of the tube 50 move at the same rate as the interior or the groove 48 as the wheel 22 is turned. With the embodiment of the invention shown during each revolution of the wheel 22 a small steel member 64 on the periphery of this wheel 22 moves past a known magnetic switch 66 capable of being actuated by such movement. Each time the wheel 22 turns in this manner the switch 66 is thus actuated. Each time this switch 66 is actuated an electric signal is supplied through it to a known conventional control apparatus 68. When this apparatus 68 is actuated in this way, it serves to operate the apparatus 16 so as to cause the laser beam 18 to be generated or created.

Once this beam 18 comes into existence it travels along a path as indicated. As it is being created the trimmer 34 is operated in a conventional manner through the operation of an actuating cylinder 69 connected to the control apparatus 68 so as to also be operated in a conventional manner. The beam 18 passing through the trimmer 34 will engage the mirror 36 and will be adjusted by the lens 40 and then will be further reflected by the mirror 42 towards the opening 44. By virtue of the movement of the wheel 22 and the construction described, this beam 18 will be directed towards the opening 44 as long as it is generated and applied as described.

Since the tube 50 moves in synchronism with the periphery of the wheel 22, this beam 18 will thus engage a given area of the tube 50 as this tube 50 moves, but as there is no relative motion between the tube 50 and the wheel 22. The member 64 and the switch 66 are positioned so that this beam 18 will be generated at about the point of initial travel of the tube 50 with the periphery of the wheel 22. The control apparatus 68 will operate to continue the generation of the beam 18 until about the point immediately prior to the tube 50 separating from the wheel 22 so that the beam 18 is applied to the tube 50 for as long a period as is reasonably possible.

As the concentrated energy from the beam 18 is applied in this manner, the energy from this beam 18 will serve to heat the spot in which it is applied. This will cause a degree of vaporization and a degree of melting in the material in this spot. This energy will thus cause the formation of a hole 70 in the tube 50. As the melting occurs it is considered that normally the heated material moves so that the interior of the hole 70 is defined by a smooth, continuous internal wall of a uniform cross-sectional configuration. Small hubs or bosses 72 may be created at both ends of this hole 70 from the material contacted by the beam 18. When such hubs 72 are formed, they obviously form a part of the tube 50. The actual formation of these hubs 72 is considered to be dependent upon the operation of the apparatus 10. Under some circumstances they may not be formed.

The apparatus 10 is constructed in such a manner that the particular hole 70 is formed during only the initial part of the travel of the tube 50 with the periphery of the wheel 22 so that the beam 18 used will intercept an inner wall 74 within this tube 50 as indicated in FIG. 5 of the drawings during the last portion of the travel of the tube 50 with the wheel 22. It will be realized that in intercepting this inner wall 74 the beam 18 travels through the hole 70 which has been utilized in creating it. As this beam 18 intercepts the wall 74 it will serve to heat the intercepted area or region of the wall 74 so as to create within it another hole corresponding to the hole 70.

The control apparatus 68 is operated by the switch 66 so that each time a hole 70 is to be formed as indicated the apparatus 68 causes actuation of the apparatus 16 creating the beam 18 described. As the beam 18 is created and passes as indicated, this beam 18 will pass through the trimmer 34 so that its size, energy and diffraction are controlled in such a manner that the depth to which the beam 18 will penetrate the tube 50 will be regulated to a desired degree. Because of its function, the control apparatus 68 serves as a timing device for the creation of the beam 18 at periodic intervals of desired duration which is synchronized with the movement of the wheel 22.

By virtue of this method of operation a single hole may be created in a length of a seamless or other tube without damaging or effecting a wall or walls of such tube roughly opposite from where the hole is created. This is considered to be quite important. With the apparatus 10 by appropriated adjustment of the mirror 42 a second hole created within an internal wall can be created at either a point in the same plane transverse to the axis of the tube such as the tube 50, or may be created at an angle to such plane. It is considered preferable to create such a second hole at an angle as indicated so as to avoid direct flow effects involving something of a jet action leading from one hole to another in a tube such as the tube 50 when such a tube is to be employed in irrigation or similar applications.

For such application, it is considered that normally it will be preferable to have all of the holes used of the same diameter. One virtue of the apparatus 10 lies in the fact that it is possible to insert within the control apparatus 68 a conventional counting type mechanism which will actuate the apparatus 16 so that successive beams 18 contain either increased or decreased energy. By regulating the energy in this manner or by controlling the time when beams 18 are applied, it is possible to regulate the dimensions of any holes created so that such successive holes are either of an increased or decreased size.

Extremely small changes in the measurement of holes created in this manner may be quite advantageous in providing tubes such as the tube 50 which are to be utilized in comparatively long lengths in that with such gradations in hole size it is possible to provide tubes which will emit from the various different holes used approximately the same amounts of water even though there will be a pressure drop in the water within the interiors of such tubes due to their lengths and the configurations to which they may be bent. It is to be realized that extremely small changes in hole diameters are normally required to accomplish such compensations for fluid pressure drop.

In FIGS. 7 and 8 of the drawings there is shown a modified wheel 22' which is extremely similar to the wheel 22 previously described and which can be utilized with the apparatus 10. For convenience of explanation various parts of the wheel 22' which are the same or substantially the same as parts previously described are not indicated herein in a separate manner and are designated in the drawings and in the remainder of this specification by the primes of the numerals previously used to designate such parts.

The wheel 22' is primarily intended to be utilized when it is desired to create a series of holes such as the hole 70 which are located more closely together than possible with the wheel 22. It employs a plurality of openings 44', a plurality of the mirrors 42' and a plurality of the condensing lens 40'. In the place of the mirror 36' having sloping faces 76 which are directed to deflect a beam 18' to any of the sets of lens 40' and mirrors 42' towards any of the openings 44' as there is actuation and operation as previously described. With an apparatus 10 utilizing this wheel 22' the beam 18' should be directed towards the mirror 36' as shown in FIG. 8 of the drawings so as to hit successive faces 76.

From a consideration of the preceding it will be realized that the apparatus 10 is essentially a very simple apparatus which may be utilized in the rapid production of holes as described in tubing of a thermoplastic character. This apparatus 10 may be constructed with a minimum of difficulty and is essentially simple to operate, yet it is extremely effective for its intended purpose.

It is considered that one of the reasons the described apparatus 10 is particularly effective relates to the fact that this apparatus is constructed as indicated so that the laser beam 18 engages the tube 50 at a constant angle as this beam 18 is applied to the tube 50. This is considered to contribute to the desired character of holes such as the hole 70 created as indicated in the preceding discussion. It will be realized that this angle can be adjusted as indicated in the preceding discussion. In a similar way the length of time that the beam 18 engages a tube such as the tube 50 can be varied through conventional type operation of the control means 68 so that at successive periodic intervals a hole will not be created in the internal wall 74.

By providing appropriate, conventional lens systems, such as by using other than a condensing lens 40, the beam 18 may be made to assume a conical type of shape in the region where it engages either the tube 50 or the internal wall 74 so that either the hole created in the exterior of the tube 50 or the hole created in the interal wall 74 will be larger than the other in accordance with the diameter of the beam as it creates either of these holes. Obviously the larger the beam creating a specific hole, the more contact with the beam necessary to create a hole.

Because of the fact that the invention can be utilized in various different ways as indicated, it will be apparent that the invention involves the broad operative features or principles set forth in the preceding discussion. These principles or features are set forth in the appended claims forming a part of this disclosure. These operative features or principles are independent of precise mechanical details such as, for example, the use and/or shape of the groove 48 or the manner in which the wheel 22 is driven.

We claim:

1. An apparatus for use in creating a hole in an elongated flexible member which comprises:
    wheel means having a periphery;
    means for mounting the wheel means for rotation;
    holding means for holding at least a portion of the elongated flexible member with respect to said periphery so that there is substantially no relative movement between said portion of said flexible member and said wheel means as said wheel means rotates;

reflecting means for reflecting a laser beam;

first means for rotatably mounting said reflecting means for rotation in synchronism with said wheel means;

laser means for creating and directing a laser beam toward said reflecting means; and said reflecting means being positioned relative to said laser means and said wheel means so that the laser beam emitted from said laser means is directed toward a specific area of said portion of said flexible member during rotation of said wheel means through an arc with the laser beam intersecting said specific area at a first angle, said first angle being constant for the period that the wheel means rotates through said arc.

2. An apparatus as claimed in claim 1 including:

control means for actuating said laser means so that a laser beam is created and engages said flexible member at periodic intervals in order to create a sequence of holes in said flexible member.

3. An apparatus as claimed in claim 1 including:

means for rotating said wheel means.

4. An apparatus as claimed in claim 1 wherein:

said wheel means has a groove in said periphery, said groove having a bottom, said wheel means having an opening leading to the bottom of said groove;

said flexible member fits within said groove; and said reflecting means and said laser means are located so that the laser beam is reflected through said opening.

5. An apparatus as claimed in claim 1 wherein:

said first means mounts said reflecting means on said wheel means so as to rotate with said wheel means.

6. An apparatus as claimed in claim 5 wherein;

said reflecting means includes a mirror for reflecting said laser beam and another mirror for receiving said laser beam after it has been reflected by said first mentioned mirror and for further directing said laser beam towards said flexible member, the positions of said mirrors serving to determine the angle at which said laser beam is directed toward said elongated flexible member.

7. An apparatus as claimed in claim 6 including:

control means for actuating said laser means so that a laser beam is created and engages said flexible member at periodic intervals in order to create a sequence of holes in said flexible member, wherein said wheel means has a groove in said periphery, said groove having a bottom, said wheel means having an opening leading to the bottom of said groove;

said flexible member fits within said groove; and said reflecting means and said laser means are located so that a laser beam is reflected through said opening.

8. An apparatus as claimed in claim 1 including:

control means for actuating said laser means in accordance with the angular position of said wheel means so that a laser beam is created and engages said flexible member at periodic intervals in order to create a sequence of holes in said flexible member, wherein said first means mounts said reflecting means on said wheel means so as to rotate with said wheel means.

9. An apparatus for use in creating a hole in an elongated flexible member which comprises:

wheel means having a periphery;

means for mounting the wheel means for rotation;

holding means for holding at least a portion of the elongated flexible member with respect to said periphery so that there is substantially no relative movement between said portion of said flexible member and said wheel means as said wheel means rotates;

reflecting means for reflecting a laser beam;

means for mounting said reflecting means for rotation;

laser means for creating and directing a laser beam toward said reflecting means; and means for synchronizing the rotation of the wheel means and the reflecting means so that the reflecting means reflects the laser beam toward a region of said portion of the elongated flexible member with the laser beam intersecting said region at a first angle as the wheel means rotates through an arc, said first angle being constant for the period that the wheel means rotates through said arc and said period being of sufficient duration so that the hole is formed at said region.

10. An apparatus as defined in claim 9 wherein the wheel means is rotatable about a rotational axis and said reflecting means includes a reflector located on said rotational axis.

11. An apparatus as defined in claim 10 wherein said reflecting means includes a second reflector, said first mentioned reflector reflecting the laser beam onto said second reflector, and a lens in the path of the laser beam between said reflectors.

12. An apparatus for use in making a hole in a member, said apparatus comprising:

first means for moving the member through a hole-making station;

second means for directing a laser beam toward the member to provide an impingement of the laser beam against a first region of the member at a first angle as the first region enters the hole-making station;

means for moving the laser beam during the movement of the first region through the hole-making station; and means for synchronizing the movement of the laser beam and the first region of the member to maintain said impingement of the laser beam against said first region at said first angle throughout the movement of the first region through the hole-making station whereby the laser beam forms a hole in said first region of the member as the first region is moved through the hole-making station.

13. An apparatus as defined in claim 12 wherein said first means continuously moves the member through the hole-making station and said synchronizing means synchronizes the movement of the laser beam with the continuous movement of the first region of the member to maintain said impingement.

14. An apparatus as defined in claim 12 wherein said first means moves the first region of the member along an arcuate path through the hole-making station.

15. An apparatus as defined in claim 14 wherein said arcuate path has a center of rotation and said second means moves the laser beam about said center of rotation during the synchronous movement of the laser beam and the first region.

* * * * *